(12) United States Patent
Saha et al.

(10) Patent No.: US 6,606,501 B1
(45) Date of Patent: Aug. 12, 2003

(54) TOA POSITIONING OF GPRS MOBILES WITHIN THE BSS CENTRIC ARCHITECTURE OF A GSM NETWORK

(75) Inventors: Bikash Saha, Plano, TX (US); Shahrokh Amirijoo, Richardson, TX (US); Clive Fernando, Plano, TX (US)

(73) Assignee: Ericsson, Inc., Richardson, TX (US)

( * ) Notice: Subject to any disclaimer, the term of this patent is extended or adjusted under 35 U.S.C. 154(b) by 0 days.

(21) Appl. No.: 09/437,940

(22) Filed: Nov. 10, 1999

(51) Int. Cl.[7] ................................................. H04Q 7/20
(52) U.S. Cl. ........................ 455/456; 455/457; 455/433; 455/440; 342/450; 342/463; 370/331
(58) Field of Search ............................... 455/456, 457, 455/517, 524, 438, 426, 433, 434, 440; 370/331, 519, 508, 350, 337, 324; 342/450, 463

(56) References Cited

U.S. PATENT DOCUMENTS

| | | | |
|---|---|---|---|
| 5,966,378 A | * 10/1999 | Hamalainen | ................ 370/348 |
| 6,104,929 A | * 8/2000 | Josse et al. | .................. 455/445 |
| 6,212,391 B1 | * 4/2001 | Saleh et al. | .................. 455/456 |
| 6,282,427 B1 | * 8/2001 | Larsson et al. | ............. 455/456 |
| 6,295,450 B1 | * 9/2001 | Lyer et al. | ................... 455/436 |
| 6,347,228 B1 | * 2/2002 | Ludden et al. | .............. 455/456 |
| 6,389,008 B1 | * 5/2002 | Lupien et al. | .............. 370/352 |
| 6,452,940 B1 | * 9/2002 | Yared et al. | ........... 297/452.32 |
| 6,466,544 B1 | * 10/2002 | Sen et al. | ..................... 370/231 |
| 6,466,552 B1 | * 10/2002 | Haumont | ..................... 370/310 |
| 6,487,595 B1 | * 11/2002 | Turunen et al. | ............. 709/226 |

FOREIGN PATENT DOCUMENTS

| WO | WO 99/37109 | * 7/1999 | ............ H04Q/7/34 |
|---|---|---|---|

* cited by examiner

*Primary Examiner*—Dwayne Bost
*Assistant Examiner*—Khawar Iqbal

(57) ABSTRACT

A system for TOA positioning of a GPRS mobile station (20) in a GSM network (10) comprises a Gateway GPRS Support Node (GGSN) (32) providing an interface to an LCS application (52) and adapted to communicate with the GPRS mobile station (20). The system further comprises a Base Station Subsystem (14) serving the GPRS mobile station (20). The BSS (14) is communicably accessible by the LCS application (52) through the GGSN (12). The system also comprises a plurality of Location Management Units predisposed about the GSM network (10) and configured to be utilized to measure the TOA of an access burst delivering positioning coordinates corresponding to an approximate position for the GPRS MS (20). A Packet Control Unit (16) is provided and adapted to communicate directly with LMUs (44) that are GPRS capable and indirectly with non-GPRS LMUS (44) through the BSS (14).

30 Claims, 5 Drawing Sheets

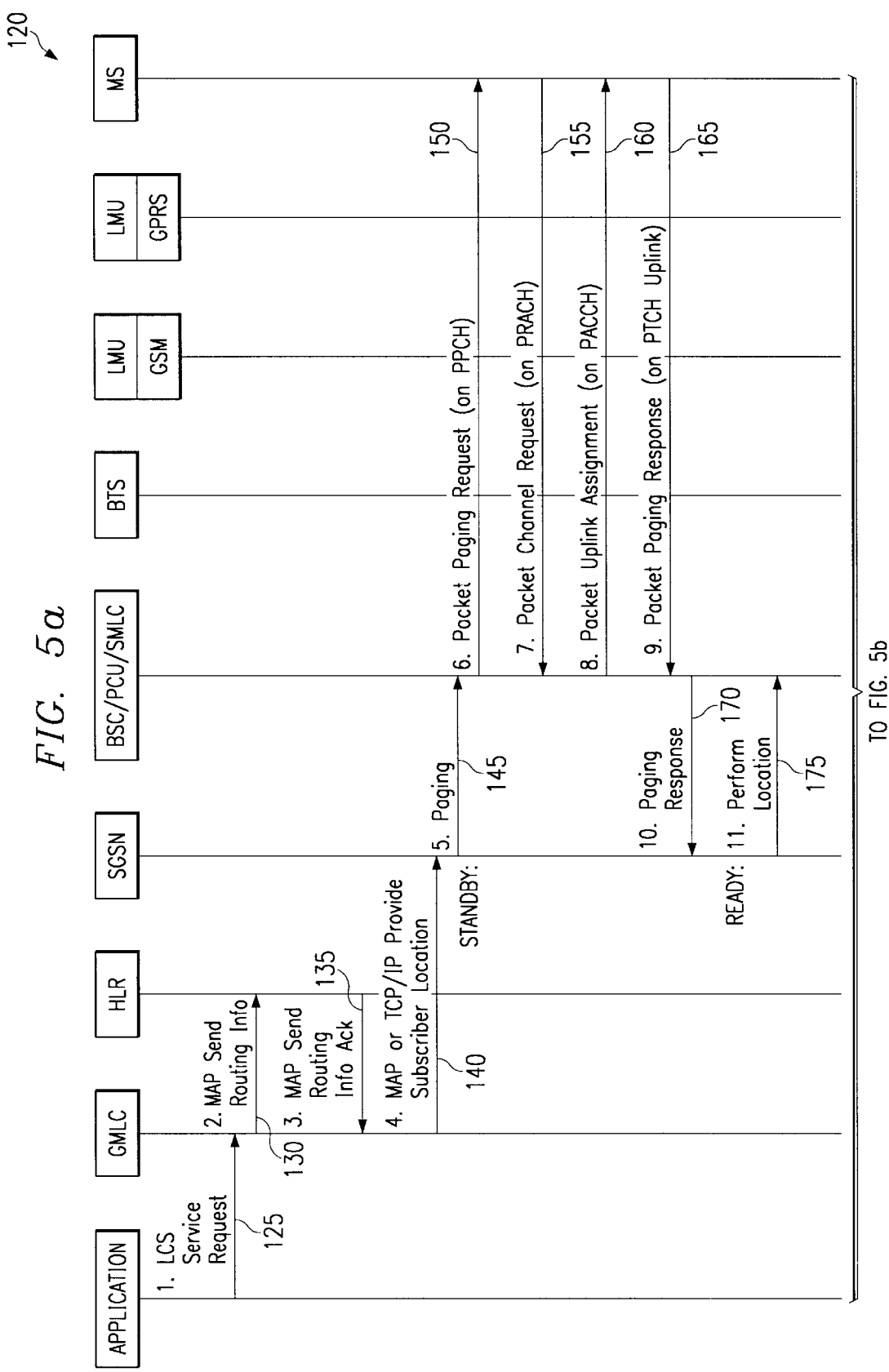

TOA POSITIONING OF GPRS MOBILES WITHIN THE BSS CENTRIC ARCHITECTURE OF A GSM NETWORK

RELATED APPLICATION

This application relates to patent application Ser. No. 09/195,347 entitled "Positioning of GPRS Mobiles Using TOA Methodology" by Shahrokh Amirijoo, Bagher R. Zadeh, Bengt Yngve Persson, and Bengt Axel Torbjorn Olsson, the entirety of which is herein incorporated by reference.

TECHNICAL FIELD

This invention relates generally to cellular communications and applications, and more particularly to a system and method of delivering Time of Arrival (TOA) positioning data for a General Packet Radio Service (GPRS) mobile in a Global System for Mobiles (GSM) communications network.

BACKGROUND OF THE INVENTION

Wireless telecommunication systems continue to evolve and are currently being deployed in countries throughout the world. There are several types of wireless communication systems currently in service and being deployed including AMPS, D-AMPS, TDMA, CDMA and GSM. These wireless telecommunication systems are currently manufactured by a number of manufacturers, the operation of which are defined by standards groups delegated with the responsibility of ensuring system interoperability. While these various wireless telecommunication systems may have common features, the operability of each is unique.

The Global System for Mobile Communications or GSM, in particular, is one of the newer wireless telecommunication systems being developed and deployed. The GSM system is intended to be widely deployed throughout the world to facilitate reliable wireless telecommunications using one or more GSM standards. The GSM standards continue to evolve, and are currently being discussed and refined to provide for planned services, as well as services to be developed and employed in future generations. Currently, second generation GSM systems are being deployed while third generation (3G) systems are currently under development with planned implementation scheduled for around the year 2000.

In current GSM systems, positioning of a mobile station (MS) is currently provided in limited situations. Specifically, Time Of Arrival (TOA) based positioning has been selected as the mandatory positioning method by the T1P1.5 standards body, requiring an asynchronous intra-cell handover to the same channel during intra-cell handovers. The reason for this is to force the mobile to transmit access bursts to facilitate an intra-cell handover, whereby the time of arrival of the access bursts are measured by surrounding Location Mobile Units (LMUs). These measurements are used in a triangulation process to pinpoint the mobile's geographical position.

With respect to the General Packet Radio Services (GPRS) class of mobile stations in particular, the intra-cell handover procedure is not suitable as a positioning procedure to locate the geographical position of the mobile. GPRS mobiles don't have the ability to perform the same Intra-cell handover procedure required in the GSM TOA positioning, and thus a solution facilitating positioning GPRS mobiles is required. The present invention provides for the positioning of GPRS mobiles in a GSM network.

More specifically, according to existing GSM standards, current LMUs cannot distinguish between an access burst generated a GSM mobile versus one generated by a GPRS mobile since, at present, not all LMUs in the network can understand the entire GPRS signaling protocol and thus are not able to communication with GPRS system components. While future deployments are expected to result in LMUs that support the entire GRPS protocol, an interim solution is needed to support interoperability with existing non-GRPS LMUs. As such, a positioning scheme that is able to account for the anticipated mix of both GPRS and non-GPRS LMUs would provide numerous advantages.

SUMMARY OF THE INVENTION

The present invention provides a system and method of delivering TOA positioning data for GPRS mobile stations in a GSM network. With the present invention, a complete solution for TOA positioning within the Base Station Subsystem (BSS) centric of the wireless network is provided, allowing signaling between different network components and LMUs that are both GPRS and non-GPRS compatible.

Accordingly, disclosed in one embodiment is a system for positioning a GPRS mobile station in a GSM network by delivering Time of Arrival (TOA) positioning data to a Location Services (LCS) application. The system includes a Gateway GPRS Support Node (GGSN) providing an interface to the LCS application and a Serving GPRS Support Node (SGSN) communicably coupled with the GGSN.

The SGSN is further adapted to communicate with the GPRS mobile station over the GSM network. The SGSN is the node within the GSM network that sends and receives data to and from a GPRS mobile station in the network. In addition, the SGSN keeps track of GPRS mobile stations within its service area. The GGSN, on the other hand, maintains connections with the other networks such as the Internet, X.25 networks or private networks, for example. A GPRS network can use multiple serving nodes, but requires only one gateway node for connecting to an external network such as the Internet.

The system further comprises a Base Station Substation (BSS) serving the GPRS mobile station. The BSS, which includes a Base Transceiver Station (BTS) and a Base Station Controller (BSC), is communicably accessible by the LCS application through the GGSN. A plurality of LMUs are provided and predisposed about the GSM network and configured to deliver TOA positioning coordinates corresponding to an approximate position of the GPRS mobile station. The BSC, as an integral part of the BSS, is configured to select which of the plurality of LMUs are to be used for positioning of the GPRS mobile station. The BSC can be used to determine which of the LMUs are GPRS capable and which of the LMUs are non-GPRS capable. In one embodiment, this information is part of the BSC positioning mechanism meaning that the positioning process is contained almost entirely in the BSS centric.

The system also comprises a Packet Control Unit (PCU) adapted to communicate with the BSS and the LMUs for responding to LCS information requests received through the SGSN. The PCU is further adapted to access the BSC and determine which of the LMUs are GPRS capable and which of the LMUs are non-GPRS capable. In this way, the PCU is able to communicate directly with LMUs which are GPRS capable and indirectly through the BSC with non-GPRS capable LMUs.

According to one embodiment, the PCU is configured to transmit a LOCATION INFORMATION REQUEST messages to the BSC. After receiving a message from the PCU, the BSC sets up a GSM connection to the GPRS mobile station. In the alternative, the BSC can use an existing connection to transfer data to the GPRS mobile station after receiving a POSITIONING REQUEST message from the PCU. Other aspects of the signaling protocol for positioning of the GPRS mobile are shown and illustrated.

During the entire TOA positioning process, the non-GPRS capable LMUs are able to recognize an access burst from the GPRS mobile station. This is accomplished by having the BSC notify the non-GPRS capable LMUs to expect an access burst from the GPRS mobile station. The non-GPRS capable LMUs are configured to manage the access burst sent by the GPRS mobile station.

A technical advantage of the present invention includes the provision of signaling sequences between different network nodes, including the BSS nodes and LMUs, for a complete TOA positioning solution within the BSS centric architecture of a GSM network.

Another technical advantage is the use of non-GPRS capable LMUs for positioning of GPRS mobile stations.

Still another technical advantage is the ability of positioning GPRS mobile stations using newer GPRS-capable LMUs.

BRIEF DESCRIPTION OF THE DRAWINGS

The above features and advantages of the present invention will be more clearly understood from consideration of the following detailed description taken in connection with accompanying drawings in which.

Corresponding numerals and symbols in the figures refer to corresponding parts in the detailed description: unless otherwise indicated.

DETAILED DESCRIPTION OF PREFERRED EMBODIMENTS

While the making and using of various embodiments of the present invention are discussed in detail below, it should be appreciated that the present invention provides many inventive concepts which can be embodied in a wide variety of specific telecommunications applications. The specific embodiments discussed herein are merely illustrative of specific ways to make and use the invention, and do not delimit the scope of the invention.

Figure 1:
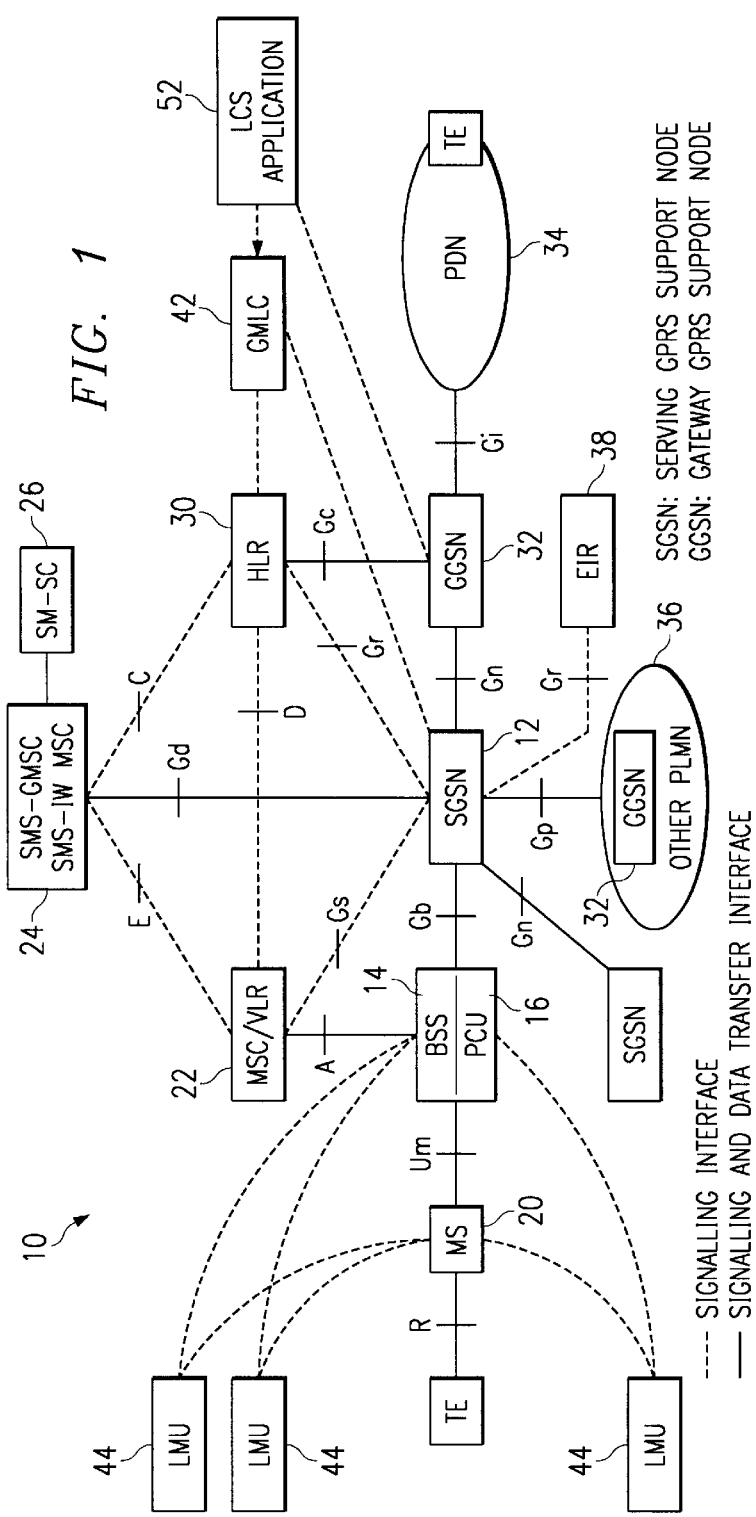
FIG. 1 is a block diagram of a typical GPRS logical architecture including a GPRS mobile station to be positioned by a network.

Referring first to FIG. 1 therein is shown at 10 a GPRS logical architecture of a GSM wireless communication network. A serving GPRS support node (SGSN) is generally shown at 12 and is seen to service a base switching station (BSS) 14 having combined therewith a Packet Control Unit (PCU) 16. The BSS 14 serves a mobile station 20 via an RF link, the mobile station 20 comprising a GPRS type mobile receiver transmitter or similar GPRS-type device. A Mobile Switching Center (MSC) 22 having provided therewith a Visitors Location Register (VLR) services the BSS 14. The MSC 22 is interconnected with the SGSN 12 and a short message service (SMS) gateway MSC (GMSC) 24.

Functionally coupled to SMS-GMSC 24 is a short message service controller (SMSC) 26. A Home Location Register (HLR) 30 forms another node of the network 10 and is interconnected with the other nodes. The HLR 30 is accessible to the SGSN 12. A gateway GPRS support node (GGSN) is seen at 32 and interfaces the SGSN 12 with a PDN 34 for exchanging communication between the GSM network 10 and other networks. Likewise, a separate GGSN 32 may be provided to interface other Public Land Moble Networks (PLMN) to the SGSN 12. An EIR 38 is also connected to SGSN 12, as shown.

The GSM network 10 according to the present invention provides Time Of Arrival (TOA) positioning of the GPRS mobile station 20 through the use of a Serving Mobile Location Center (SMLC) which provides the positioning algorithms and, more generally, the mechanism which works in connection with multiple location measurement unit (LMUs) 44, to facilitate positioning of the GPRS mobile station 20 within the network 10.

Figure 2:
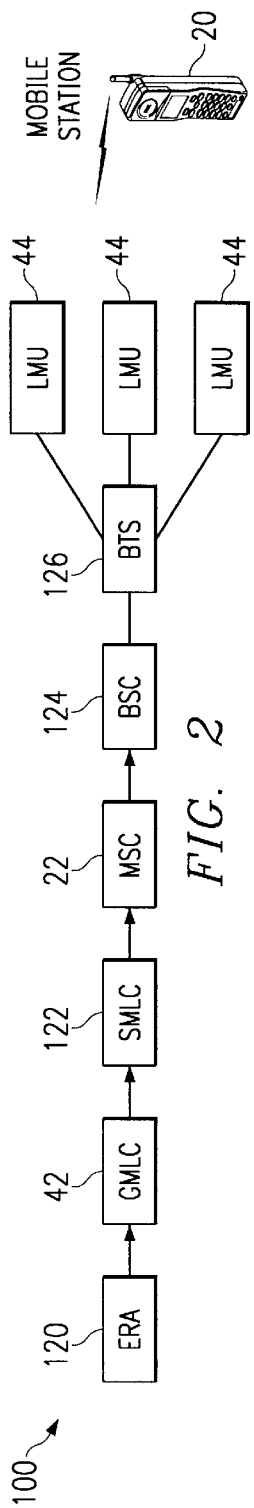
FIG. 2 shows the current architecture for TOA positioning system with the positioning function contained in the BSS centric of the network.

To better understand the invention, reference is made to FIG. 2, which depicts the architecture for TOA positioning, denoted generally as 100. The TOA positioning architecture 100 includes an external requesting agent 120 which communicates a positioning request to the GMLC 42 in the GSM network 10. Positioning is then initiated at the GMLC 42 which then forwards the request to the network based Serving Mobile Location Center (SMLC) 122. Essentially, the SMLC 122 provides the positioning functionality of the GSM network. The SMLC 122 decides what LMUs 44 should be involved in the TOA positioning process.

While the invention is described throughout in connection with an SMLC 122, it should be understood that any positioning function or functions may be utilized according to various positioning algorithms, systems and methodologies known to those of ordinary skill in the art. As such, the terms "SMLC" and "positioning function" shall be used interchangeably throughout.

The LMUs 44 are used to calculate positioning coordinates for the mobile station 20. Once a set of LMUs 44 have been selected for TOA positioning, the positioning information is routed to the MSC 22. The MSC 22 provides all the functionality needed to handle a mobile subscriber, such as registration, authentication, location updating, handovers, and call routing to a roaming subscriber.

While the TOA positioning architecture 100 is useful in providing positioning coordinates for a mobile station 20, it suffers from certain limitations when used to position the newer class of GPRS mobile stations that require special signaling in order to implement the GPRS signaling protocol. In particular, some of the LMUs 44 may not be able to support the GPRS signaling protocol, and as such, may not be able to communicate with GPRS system components or nodes in the network. The network operator is thus faced with the prospect of updating current LMU functionality within the network coverage area or installing LMUs capable of supporting GPRS signaling across the network at great expense. The present invention provides an interim solution that operates within the confines of a network architecture comprising both GPRS and non-GPRS compatible LMUs.

Figure 3:
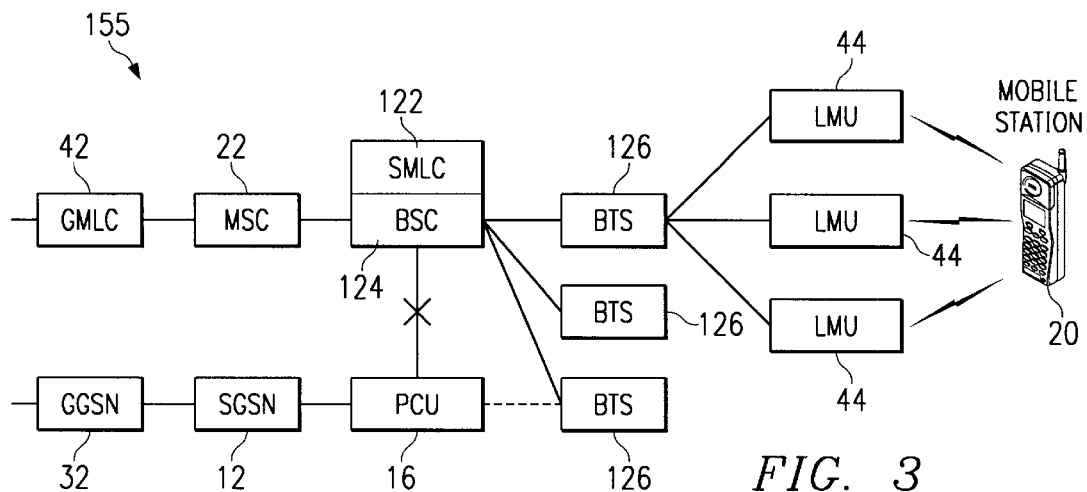
FIG. 3 illustrates TOA positioning of GPRS mobile stations using the BSS Centric Architecture according to the invention.

Since third generation GPRS systems dictate the use of a Packet Control Unit (PCU) 16 as the GPRS flow control component within the GPRS portion of the network, the present invention provides for positioning of GPRS mobile stations 20 within the GSM network 10 utilizing the PCU 16. This configuration is illustrated in FIG. 3 with the PCU 16 shown interfaced with the BSC node 124 within a network scheme 155. Here it is assumed that the LMUs 44 are comprised of both GPRS and non-GPRS compatible LMUs in a network 155 containing one or more GPRS mobile stations 20.

Essentially, the positioning function (or SMLC) selects a number of LMUs 44 for the purpose of obtaining radio interface measurements to locate or help locate the GPRS mobile station 20. The positioning function is aware of and understands the capabilities of its LMUs 44. Thus, the positioning function knows if an LMU 44 is capable of distinguishing an access burst received from a GPRS mobile station as opposed to one received by a non-GPRS mobile station within the network. Signaling between the positioning function and LMU 44 is transferred via the MSC 22 serving the positioning LMU 44. The measurements returned by an LMU 44 to the positioning function have a generic status in being suitable for use in more than one positioning methodology.

Alternatively, the positioning function and GMLC 42 may be combined in the same physical node, combined in existing physical nodes, or reside in different nodes. The positioning function or SMLC 122 and GMLC 42 are not interconnected, but communicate with one another through the MSC 22. When the MSC 22 and GMLC 42 are in different PLMNs, they are interconnected and communicate via an air interface.

The network 155 is configured to provide TOA measurements computed from access bursts generated by the GPRS mobile station 20. These bursts are generated by having the GPRS mobile station 20 perform an asynchronous intracell handover. Access bursts are received and measured by serving and neighboring base stations. A BTS 126 and a BSC 124 serving the GPRS mobile station 20 for which TOA positioning data is requested are included in the network 155. The BSC 124 is communicably accessible by the LCS application 52 through the GMLC 42. The LCS application 52 is the entity within the network responsible for obtaining the positioning information for the GPRS mobile station 20.

The LMUs 44 are available and utilized to compute positioning coordinates for the GPRS mobile station 20. The BSC 124 can include those portions of the SMLC 122 used to determine which of the LMUs 44 are appropriate for making TOA measurements used in positioning of the GPRS mobile station 20. That is, once the GPRS mobile station 20 has generated an access burst, the TOA from the GPRS mobile station 20 to the appropriate BTS 126 is determined.

The LMUs 44 make radio measurements to support one or more positioning methods. These measurements fall into one of two categories: location measurements specific to one GPRS mobile station 20 used to compute the location of the GPRS mobile station 20; or assistance measurements specific to all GPRS mobile station 20 in a certain geographic area. All location and assistance measurements obtained by an LMUs 44 are supplied to the SMLC 122 associated with the selected LMUs 44. Instructions concerning the timing, the nature and any periodicity of these measurements are provided by the SMLC 122 or are pre-administered in the LMUs 44.

All signaling to the selected LMUs 44 is exclusively over the GSM air interface. There is no wired connection to any other network element. An individual LMU 44 thus has a serving BTS 126, BSC 124, MSC 22 and interacts with these nodes of the network 155 like a normal mobile station. In particular, an LMU 44 has its own IMSI and interface that are necessary components to the LMU 44 procedures.

To ensure that the LMU 44 and the SMLC 122 cooperate during the positioning process, an LMU 44 may be homed (camped) on a particular location area (or location areas) belonging to one MSC 22. For all LMUs 44, the MSC 22 contains a special profile indicating no supplementary services. An identifier in the MSC 22 can also distinguish LMlUs 44, according to their capabilities such as, for example, whether or not a specific LMU is GPRS capable. All other data specific to an LMU 44 is administered in the BSC 124 through uyse of its associated SMLC 122.

Figure 4A:
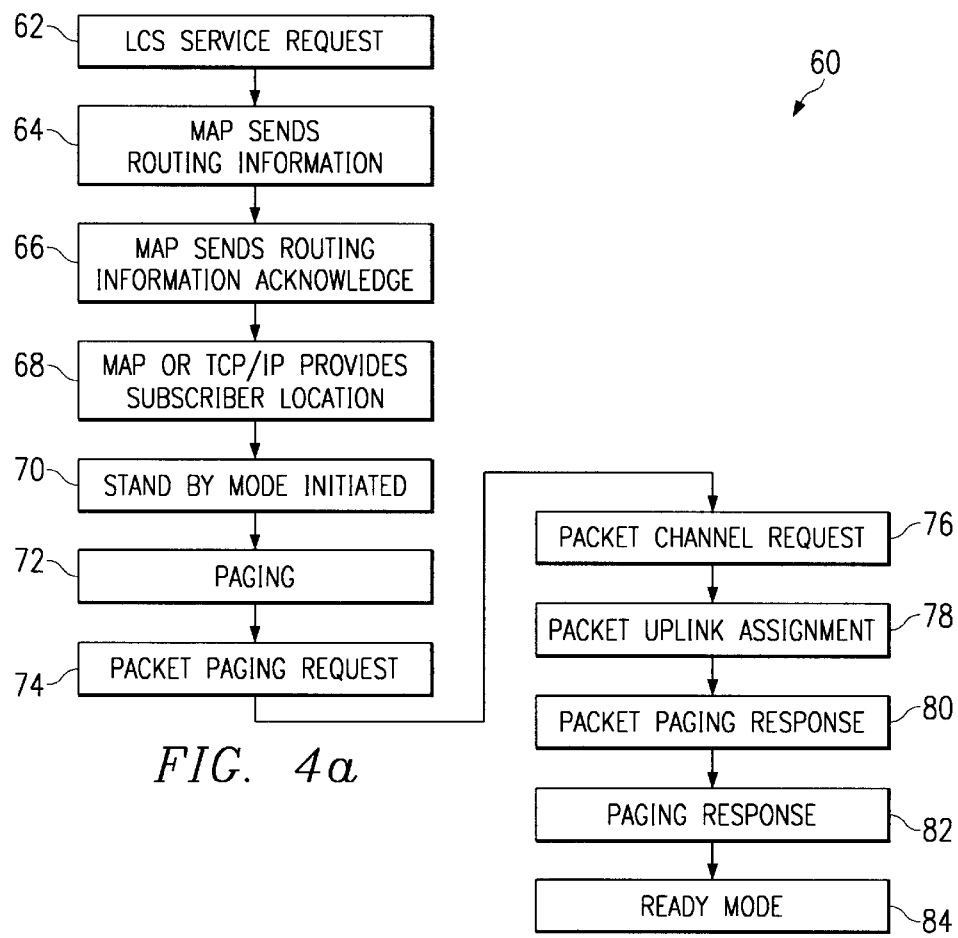
FIGS. 4a and 4b illustrate a process flow diagram of the signaling interfaces for a TOA positioning method according to the invention.
Figure 4B:
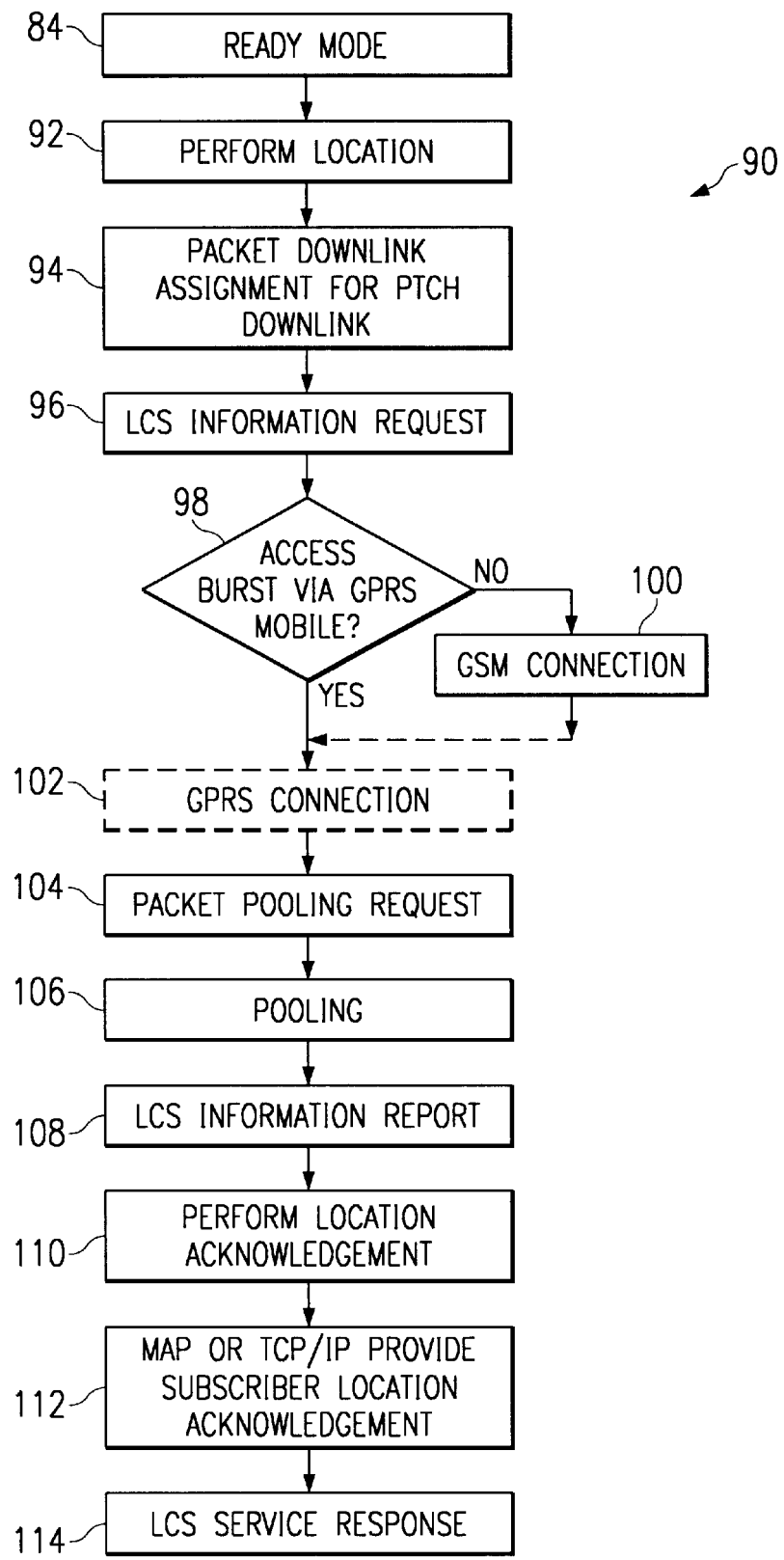

With reference to FIG. 4, a flow diagram of the signaling process for positioning a GPRS mobile station 20 in the GSM network 10 is shown and denoted generally as 60. Process 60 begins where the LCS application 52 transmits an LCS service request to the GMLC 42, or GGSN 32 (step 62). Routing information is then sent via a standard MAP message (step 64) to the HLR 30. A routing information acknowledgment is sent from the HLR 30 (step 62). The routing information acknowledgement can be received by the GGSN 32 providing a mechanism for the subscriber location informaiton to be obtained and provided to the SGSN 12 (step 68). The SGSN, in turn, can enter a standby mode (step 70) and paging begins (step 72) from the SGSN 12 to the BSC 124.

Once the BSC 124 has been paged by the SGSN 12, a packet paging request is then sent on the Packet Changing Channel (PPCH) from the BSC 124 to the GPRS mobile station 20 (step 74). The GPRS mobile station 20 then sends a Packet Channel Request on the PRACH channel to the BSC 124 (step 76). Next, a MS packet uplink assignment is transmitted from the BSC 124 to the GPRS mobile station 20 on a PAGCH channel (step 78). The packet uplink assignment is followed by a packet paging response on a PPCH channel uplink from the GPRS mobile station 20 to the BSC 124 (step 80).

A paging response (step 82) is sent from the BSC 124 to the SGSN 12. Once the SGSN 12 has received this paging response, ready mode is then initiated (step 84).

Figure 5B:
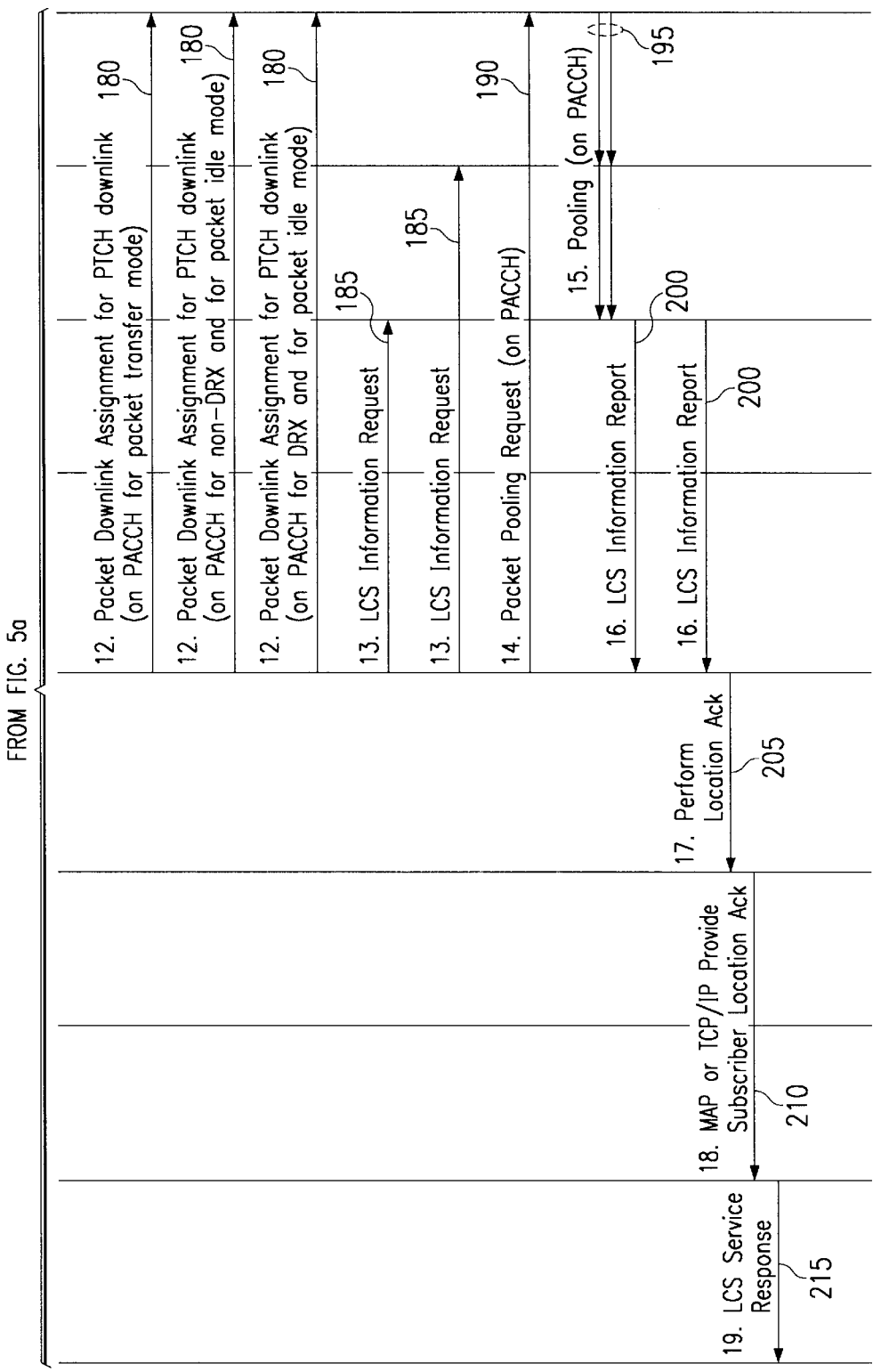
FIG. 5 is a signaling sequence diagram illustrating signaling interface for a TOA positioning method according to the invention.

FIG. 5 is the continuation of the process 60 for the signaling interface of the GPRS positioning method, according to the invention. Once in ready mode (step 84), positioning of the GPRS;mobile station 20 is then performed (step 92). In particular, a location performance message is sent from the SGSN 12 to the BSC 124 which, in turn, transmits a packet downlink assignment for the PPCH channel downlink (step 94) to the GPRS mobile station 20.

Alternatively, the BSC 124 may send a packet downlink assignment for PPCH downlink to the GPRS mobile station 20 on a PACCH for non-DRX and for packet idle mode; or the BSC 124 may send a packet downlink assignment for PPCH downlink to the GPRS mobile station 20 on a PACCH for DRX and for packet idle mode.

Once the proper packet downlink assignment has been sent from the BSC 124 to the GPRS mobile station 20 (step 94), an LCS information request is sent from the BSC 124 to the LMUs 44 (step 96). The LCS information request is sent in order to configure the LMUs 44 and can be transmitted on the GPRS or GSM connection, depending on whether the LMUs 44 are GPRS capable or not. In the case when the LMUs are not GPRS capable, the PCU 16 transfers the message the to BSC 20 which, in turn, sets up a connection or uses an already established connection to transfer the message. The usage an existing GPRS connection is more beneficial as it saves a radio resources of the network and, as such, the LMUs 44 can be constantly connected without consuming additional radio resources.

As mentioned, the existing LMUs 44 which are not GPRS capable can be used to measure the TOA of access bursts sent by the GPRS mobile station 20. Although the packet TCH channel used in GPRS is mapped on a 52-frame structure, the idle time slots coincide with the occurrence of SACCH channel in the 26-frame structure of the TCH channel. This makes it possible to use the non-GPRS capable LMUs. However, since the content of the access burst used by the GPRS mobile station 20 differs, from the GSM mobile station, the LMUs 44 have to be adapted to recognize this type of the access burst. This can be done by a SW upgrade in the existing LMUs 44. However, the non-GPRS capable LMUs have to be notified that the access bursts are from a GPRS mobile station 20. Therefore, the LCS information request (step 96) can contain an additional element that is sent to indicate whether the access burst is from a GPRS mobile station 20 (step 98).

If the transmitted access burst is not from a GPRS mobile station 20, then a GSM connection is established (step 100). If the access burst is from a GPRS mobile station 20, then a GPRS connection is established (step 102). Eventually, as the network is expanded and new LMUs 44 with GPRS capability are installed, a mixed network of GPRS and non-GPRS capable LMUs can be used to position the GPRS mobile station 20. That is, even if a GSM mobile station 20 is to be positioned, the GPRS capable LMUs can be used. In this case, the GPRS connection is used to configure the LMUs 44. As mentioned, the use of GPRS capable LMUs saves radio resources. In a mixed configuration of GPRS and non-GPRS LMUS, the BSC 20 is responsible for handling the LMUs 44 since it contains knowledge of the type and capabilities of the LMUs 44.

Once a GSM or GPRS connection has been made (step 100 or step 102), a Packet Pooling Request is sent (step 104) from the BSC 20 to the GPRS mobile station 20 on a PACCH channel. Pooling is then performed (step 106) from the GPRS mobile station 20 to the respective LMUs 44 on a PACCH channel. Once pooling is completed, a LCS information report is sent (step 108) from the LMUs 44 to the BSC 20. The LCS INFORMATION REPORT message may be handled in the same way the LCS information request.

A location acknowledgment is then performed (step 110) from the BSC 20 to the SGSN 34. A standard MAP or TCP/IP message may be transmitted and used to provide a subscriber location acknowledgment (step 112) from the SGSN 34 to the GGSN 36. An LCS service response is then sent from the GGSN 36 to the LCS application 52 (step 114).

Having described the process in step-by-step fashion, FIG. 5 illustrates the same process 60 as a diagram 120 illustrating the signaling sequence between components in the network. Positioning of the GPRS mobile station 20 using a TOA based positioning method, according to one embodiment of the invention, is shown entirely within the BSS centric of the network as shown across the top of the diagram 120. Upon reception of a positioning request (sequence 125) from a Location Services (LCS) application 52, the GMLC 42, equivalent to the GGSN 32, transmits (sequence 130) a routing information request via a standard MAP message to the HLR 30. A routing information acknowledgment is then sent (sequence 135) from the HLR 30 to the GMLC 42. Subscriber location is then provided by the GMLC 42 (sequence 140) to the SGSN 12.

Once a subscriber location has been provided (sequence 140), the SGSN 12 then pages (sequence 145) the BSC 124, the PCU 16, and the SMLC 122. As such, the SMLC 122 is responsible for carrying out the positioning request. It should be noted that more than one SMLC 122 may be located within the coverage area sequence of the network.

A packet paging request is then transmitted (sequence 150) on a PPCH channel to the GPRS mobile station 20. The GPRS mobile station 20 then relays a packet channel request (sequence 155) on a PRACH channel to the BSC 20. The packet channel request is then followed by a packet uplink assignment (sequence 160) on a PAGCH channel from the BSC 124 to the GPRS mobile station 20. The GPRS mobile station 20 then transmits a packet paging response (sequence 165) on a PTCH channel uplink.

Once paging is completed between the BSC 144 and the GPRS mobile station 20, a paging response (sequence 170) is then sent from the BSC 124 to the SGSN 12. It is the SGSN 126. which is communicably coupled with the GGSN 32 and adapted to communicate with the GPRS mobile station 20 over the facilities of the GSM network 10.

The SGSN 12, in turn, sends a Location Performance Signal (sequence 175) to the BSC 124. The BSC 124 then transmits a packet downlink assignment for PPCH downlink (sequence 180) on a PACCH channel for packet transfer mode. The BSC 124 may also transmit a packet downlink assignment for PPCH channel downlink (sequence 180) to the GPRS mobile station 20 on a PACCH for non-DRX and for packet idle mode. Alternatively, the BSC 124 may also transmit a packet downlink assignment for PPCH downlink (sequence 180) to the GPRS mobile station 20 on a PACCH channel for packet DRX and for packet idle mode.

Following receipt of the LCS information request, a packet pooling request is then sent (sequence 190) from the BSC 124 to the GPRS mobile station 20 on a PACCH channel. The GPRS mobile station 20 transmits the pooling request (sequence 195) on a PACCH channel to the LMUs 44, both GPRS and non-GPRS capable.

A LCS information report (sequence 200) is then sent from the plurality of GPRS-LMUs 44 to the BSC 124. The LCS INFORMATION REPORT message, like the LCS information request, is sent in order to configure the LMUs 44. The request and report messages can be transmitted on the GPRS or GSM connection, depending on whether the LMUs 44 are GPRS capable or not. In the case when the LMUs are not GPRS capable, the PCU 56 transfers the messages to the BSC 124 which, in turn, sets up a connection (GSM) or uses an already established connection to transfer the messages. The usage of the GPRS connection is more beneficial as it saves radio resources, given that both GPRS and non-GPRS capable LMUs 44 can be utilized.

A location acknowledgment is then performed (sequence 205) from the BSC 124 to the SGSN 12. The location acknowledgment is followed by a subscriber location acknowledgment provided (sequence 210) which is transmitted from the SGSN 12 to the GMLC 42. The signal link interface is completed with a LCS service response (sequence 215) which is sent from the GMLC 42 to the LCS application 52.

While this invention has been described with a reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A telecommunications system for positioning a General Packet Radio Service (GPRS) mobile station in a Global System for Mobile (GSM) communications network by delivering Time of Arrival (TOA) positioning data to a Location Services (LCS) application, said system comprising:
   a Gateway GPRS Support Node (GGSN) providing an interface to said LCS application;
   a Serving GPRS Support Node (SGSN) communicably coupled with said GGSN and adapted to communicate with said GPRS mobile station over said GSM network;
   a Base Station Subsystem (BSS) serving said GPRS mobile station, said BSS communicably accessible by said LCS application through said GGSN;
   a plurality of Location Management Units (LMUs) predisposed about said GSM network and configured to be utilized by said GSM network to deliver TOA positioning coordinates corresponding to an approximate position for said GPRS mobile station; and
   a Packet Control Unit (PCU) adapted to communicate directly with those of said LMUs that are GPRS capable and indirectly with those of said LMUs that are not GPRS capable for responding to LCS information requests received through said SGSN.

2. The system of claim 1 wherein said BSS includes a Base Transceiver Station (BTS) and a Base Station Controller (BSC).

3. The system of claim 2 wherein said BSC is configured to select which of said plurality of LMUs are used for positioning of said GPRS mobile station.

4. The system of claim 2 wherein said plurality of LMUs comprise a mix of GPRS capable LMUs and non-GPRS capable LMUs.

5. The system of claim 4 wherein said BSC includes a positioning function indicating which of said LMUs are GRPS capable and which of said LMUs are non-GRPS capable.

6. The system of claim 5 wherein said PCU is further adapted to access said positioning function and determine which of said LMUs are GRPS capable and which of said LMUs are non-GRPS capable.

7. The system of claim 6 wherein said PCU is further adapted to communicate directly with LMUs which are GRPS capable.

8. The system of claim 6 wherein said PCU is further adapted to communicate with non-GPRS capable LMUs through said BSC.

9. The system of claim 4 wherein said non-GPRS LMUs are adapted to recognize an access burst from said GPRS mobile station.

10. The system of claim 4 wherein said BSC is further adapted to notify said plurality of LMUs to expect an access burst from said GPRS mobile station.

11. The system of claim 4 wherein said non-GPRS LMUs are configured to measure the access burst sent by said GPRS mobile station.

12. The system of claim 4 wherein said non-GPRS LMUs are configured to position a GSM mobile station.

13. The system of claim 2 wherein said PCU is further configured to transfer Location Information Request messages to said BSC.

14. The system of claim 13 wherein said BSC is further adapted to set up a GSM connection to said GPRS mobile station after receiving a message from said PCU.

15. The system of claim 13 wherein said BSC is further adapted to use an existing connection to transfer data to said GPRS mobile station after receiving a message from said PCU.

16. A method for positioning a General Packet Radio Service (GPRS) mobile station in a Global System for Mobile (GSM) communications network by delivering Time of Arrival (TOA) positioning data to a Location Services (LCS) application, comprising the steps of:
   providing an interface to said LCS application via a GPRS Support Node (GGSN);
   a Serving GPRS support node (SGSN), communicably coupled with said GGSN, communicating with said GPRS mobile station over said GSM network;
   said LCS application accessing a Base station Subsystem (BSS), serving said GPRS mobile station, through said GGSN;
   said GSM network utilizing a plurality of Location Management Units (LMUs) predisposed about said GSM network for delivering TOA positioning coordinates corresponding to an approximate position for said GPRS mobile station; and
   responding to LCS information requests received through said SGSN by communicating directly through a Packet Control Unit (PCU) with those of said LMUs that are GPRS capable and indirectly with those of said LMUS that are not GPRS capable.

17. The method of claim 16, wherein said BSS Includes a Base Transceiver Station (BTS) and a Base Station Controller (BSC).

18. The method of claim 17, wherein said BSC is configured to select which of said plurality of LMUs are used for positioning of said GPRS mobile station.

19. The method of claim 17, wherein said plurality of LMUs comprise a mix of GPRS capable LMUs and non-GPRS capable LMUs.

20. The method of claim 19, further comprising the step of indicating which of said LMUs are GRPS capable and which of said LMUs are non-GRPS capable.

21. The method of claim 20, further comprising the step of said PCU determining which of said LMUs are GRPS capable and which of said LMUs are non-GRPS capable.

22. The method of claim 21, further comprising the step of said PCU communicating directly with LMUs that are GRPS capable.

23. The method of claim 21, further comprising the step of said PCU communicating with non-GPRS capable LMUs through said BSC.

24. The method of claim 19, wherein said non-GPRS LMUs are adapted to recognize an access burst from said GPRS mobile station.

25. The method of claim 19, further comprising the step of said BSC notifying said plurality of LMUs to expect an access burst from said GPRS mobile station.

26. The method of claim 19, further comprising the step of said non-GPRS LMUs measuring the access burst sent by said GPRS mobile station.

27. The method of claim 19, further comprising the step of said non-GPRS LMUs positioning a GSM mobile station.

28. The method of claim 17, further comprising the step of said PCU transferring Location Information Request messages to said BSC.

29. The method of claim 28, further comprising the step of said BSC setting up a GSM connection to said GPRS mobile station after receiving a message from said PCU.

30. The method of claim 28, further comprising the step of said BSC utilizing an existing connection to transfer data to said GPRS mobile station after receiving a message from said PCU.

* * * * *